W. B. DALE.
SELF PACKING CONNECTION FOR PIPES OR THE LIKE.
APPLICATION FILED NOV. 23, 1908.
1,024,560.
Patented Apr. 30, 1912.
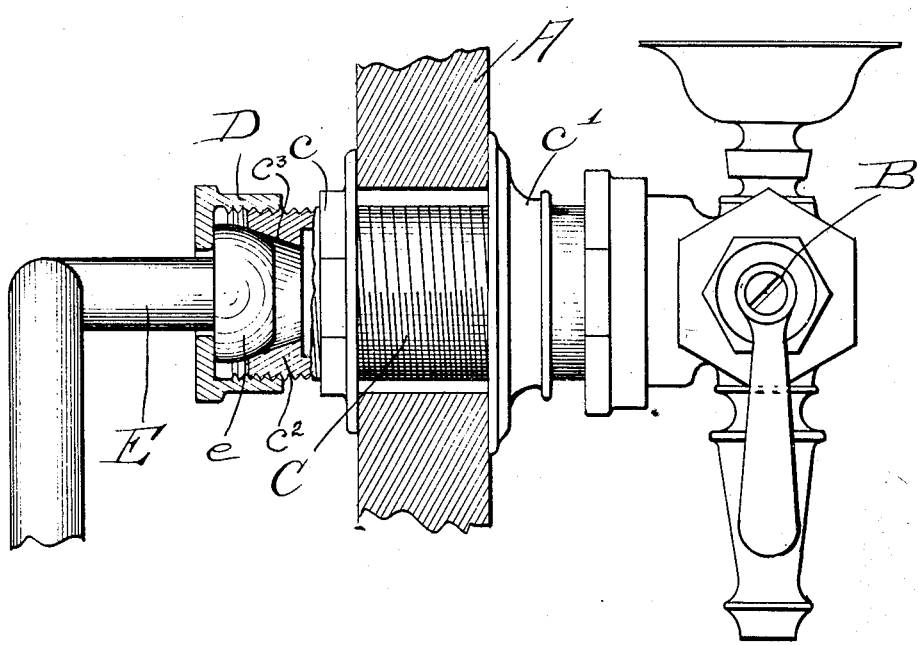
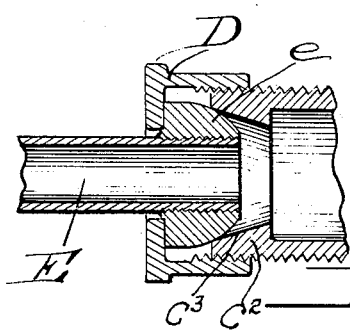
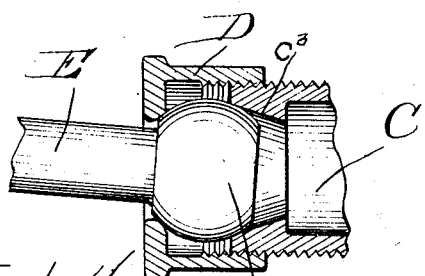
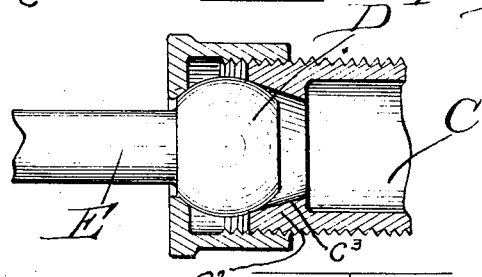
WITNESSES
INVENTOR
William B. Dale.

UNITED STATES PATENT OFFICE.

WILLIAM B. DALE, OF CHICAGO, ILLINOIS, ASSIGNOR TO STREET & KENT MFG. CO., A CORPORATION OF ILLINOIS.

SELF-PACKING CONNECTION FOR PIPES OR THE LIKE.

1,024,560. Specification of Letters Patent. Patented Apr. 30, 1912.

Application filed November 23, 1908. Serial No. 463,970.

*To all whom it may concern:*

Be it known that I, WILLIAM B. DALE, a citizen of the United States, and a resident of the city of Chicago, in the county of Cook and State of Illinois, have invented certain new and useful Improvements in Self-Packing Connections for Pipes or the Like; and I do hereby declare that the following is a full, clear, and exact description of the same, reference being had to the accompanying drawings, and to the letters of reference marked thereon, which form a part of this specification.

In connecting pipes it often occurs that the pipes to be connected are not exactly in alinement. In consequence, difficulty is experienced in bringing the same together by means of an ordinary union or by any of the fittings heretofore devised. This frequently entails considerable trouble, and expense, as it often necessitates the disconnecting of one or more pipes already set to recut the same by the plumber before the same can afford a tight joint. This is perhaps more often the case in connecting bath, toilet and basin fixtures and cocks, and it often occurs that the pipes having been sealed within the wall, very slight variation in the height of the basin or other fixture may occasion considerable trouble to the workman in connecting up the cocks.

Sometimes, where such connections have been made as have necessitated the cramping or bending of the pipes, expansion and contraction caused by the difference in temperatures of the water flowing therethrough has been sufficient eventually to produce the breaking or cracking of the pipe or joint, and leakage results.

The object of this invention is to afford a pipe connection adapted to be self-packing and of such simple nature and construction as to permit the successful use thereof by one not a skilled plumber or pipe fitter.

It is also an object of the invention to afford a connecting fitting for pipes adapted to permit the pipes to be joined tightly together even though the pipes be not in alinement and when connected adapted to permit the mutual adjustment of the parts sufficiently to avoid undue stress or strain upon the pipes connected.

The invention consists in the matters hereinafter described and more fully pointed out and defined in the appended claims.

In the drawings: Figure 1 is a view partly in side elevation and partly in vertical section illustrating the construction and application of a pipe fitting embodying my invention. Fig. 2 is a central longitudinal section of the fitting showing the same in place. Fig. 3 is a slightly modified view of the fitting similar to that portion of Fig. 1, illustrating the fitting. Fig. 4 is a view similar to Fig. 3, but showing the parts more nearly in alinement.

As shown in the drawings: A, indicates a portion of the end or side of a bath tub, or a basin slab or other suitable structure on which it is desired to support the cock or fixture B, by means of a pipe connection embodying my invention.

As shown, a threaded pipe section C, is inserted through the aperture in said slab or bowl and is provided with outer and inner jam nuts $c$—$c'$, the latter of which may be constructed as usual to afford an ornamental finish. On the inner end of said pipe section is threaded a cock B, or other fixture to be engaged thereto. The rear end of said pipe section, as shown, is formed with an inner enlargement $c^2$ which is reamed out to afford an inwardly tapering but straight faced seat $c^3$, as is usual, and threaded on the end of said pipe section is a central apertured cap D, in a familiar manner.

Secured on the end of the pipe or riser E, is a spherically rounded or convex head $e$, as shown in Figs. 1 and 2. This is usually constructed of brass or other suitable metal and is provided with a centrally threaded aperture therethrough adapted to receive the threaded end of the pipe E, and said head or enlargement is also soldered, brazed or otherwise secured to the pipe to afford an absolutely tight joint. The size of said head or enlargement $e$ with respect to said seat $c^3$, is such as to permit the same to project into said seat, but only so far that the line of contact between the two will be at the outer edge of said seat, whereby a substantially knife-edged contact is produced, as shown in Figs. 1 and 2.

As shown, the aperture in the nut D is sufficiently large to afford considerable play for adjustment for the pipe end E, and usually said nut D, is inserted in place at the opposite end of the pipe E, the size of said aperture permitting the same to pass thereover notwithstanding any bends or turns that are likely to be made therein.

In the construction shown in Figs. 3 and 4, the head D', is secured on the pipe end E, as before described, but, as shown, is spherically rounded both on the front and on the rear side to permit the same not only to seat to afford a tight joint with the pipe connection C, but as well to permit the same to be self-adjusting with reference to the nut D, even though the pipe E, may be considerably out of alinement with the pipe section C, as illustrated in Fig. 3. Obviously, with this construction, having brought the parts together, the nut D, when turned up positively jams the rounded or globular head D', on the pipe E, firmly into the inwardly tapered seat in the pipe section C, the curvature of said head D', being such as to afford a tight joint at whatsoever angle the pipe E, may be directed with reference to the bore of the pipe section C, and said head is also self-adjusting with reference to the nut D, the rounded rear surface of which adapts itself perfectly to the aperture in said nut, thus affording the connection without the possibility of any stress whatever on the pipe.

Of course, the head e, or D', may be connected in any suitable manner on the pipe E, and obviously, a connection such as described may be employed for other purposes than that herein described. I therefore do not purpose limiting myself otherwise than necessitated by the prior art.

I claim as my invention:

1. A pipe connection, embodying a pipe, a head mounted thereon and spherically rounded in part, a second pipe having an inwardly tapering but straight faced seat in which said head is adapted to engage as to its spherical part, the relative sizes of said head and seat being such that said head contacts with the outer edge only of said seat, and a follower nut engaging said head and adapted to have threaded engagement with said second pipe.

2. A pipe connection, embodying a pipe, a head mounted thereon and spherically rounded in part, a second pipe having an inwardly tapering but substantially straight faced seat in which said head is adapted to engage as to its spherical part, the relative sizes of said head and seat being such that said head contacts with the outer edge only of said seat, and a follower nut engaging said head and adapted to have threaded engagement with said second pipe.

In testimony whereof I have hereunto subscribed my name in the presence of two subscribing witnesses.

WILLIAM B. DALE.

Witnesses:
K. E. HANNAH,
J. W. ANGELL.